May 26, 1936.   A. HUNZIKER, JR   2,041,931

BUMPER ATTACHMENT

Filed Sept. 5, 1933

Witness:
V. Siljander

Inventor
Adolph Hunziker Jr.
By:
Shie & Shie
Attys.

Patented May 26, 1936

2,041,931

UNITED STATES PATENT OFFICE 2,041,931

BUMPER ATTACHMENT

Adolph Hunziker, Jr., Chicago, Ill.

Application September 5, 1933, Serial No. 688,091

10 Claims. (Cl. 293—55)

My invention relates to improvements in attachments for automobile bumpers or the like and has as its principal object the production of a prong or stud which may be readily applied to the bumper bar, a plurality or series of the devices being ordinarily applied and spaced the desired distance apart. The purpose of said devices is primarily to provide a series of prongs or studs on the rear bumper bar which will render the bumper inconvenient and uncomfortable for use as a support for a person who may desire to stand or sit on the same. The present invention is in the nature of an improvement over the device shown in my pending application, Serial No. 631,880.

The invention has among its objects the production of a device of the kind described which is simple, efficient, attractive, inexpensive and satisfactory as a safety device for the purposes set forth. The device has also as an object the production of a device which may be readily attached without tools other than a screw driver or the like, it being possible to provide as many or as few of the unitary devices to the bumper as may be found necessary or desirable. A further object is the production of a safety device which will be ornamental and attractive and embellish the bumper, as well as add to the safety.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing, wherein like reference characters indicate like or corresponding parts:

Figure 1:
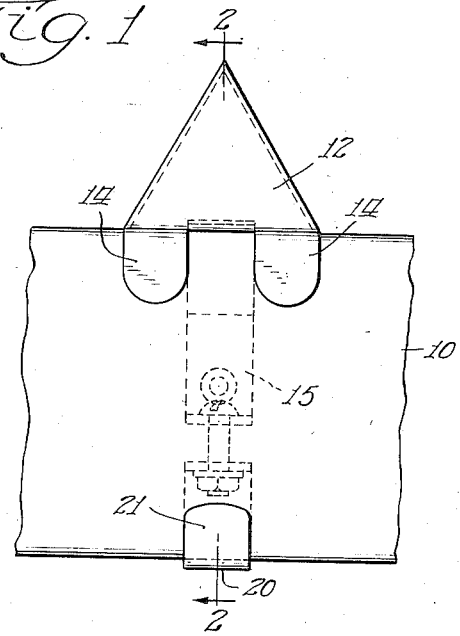
Fig. 1 is a view in elevation showing the device applied to a bumper bar.
Figure 2:
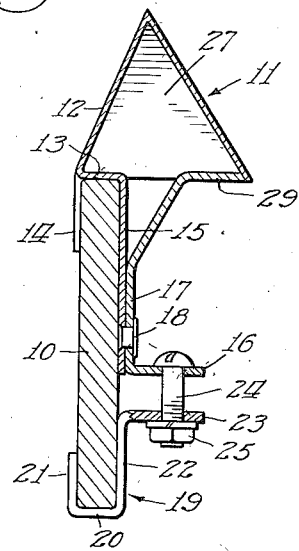
Fig. 2 is a sectional view taken substantially on line 2—2 of Fig. 1.
Figure 3:
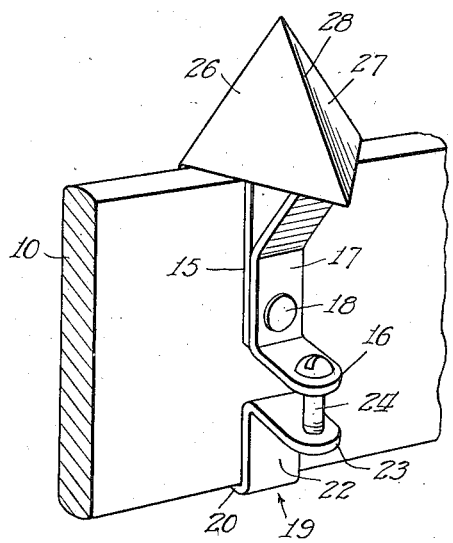
Fig. 3 is a perspective view showing the opposite side to that shown in Fig. 1.

Referring to the drawing, it may be mentioned that I provide a plurality of devices each of which is a unitary structure in itself which may be applied to the bumper bar, as many or as few of the devices being employed as may be desired. Only one device is shown in the drawing. As shown, 10 represents a portion of a car bumper bar, the rear or exposed face of the same being shown in Fig. 1, as ordinarily the safety devices are employed only on the rear bumper of an automobile. Any vehicle, however, having a bumper may be equipped with the devices. As shown, the device substantially consists of a top member designated generally as 11, which is mounted on the top edge of the bumper bar, a cooperating securing member generally designated as 19 which engages the lower edge of the bar and interconnecting means between the parts 11 and 19, said interconnecting means being adjustable to permit the device to be readily fastened to bumper bars of different sizes. The member 11 is made up of a plate part 13 which is arranged to seat upon the top edge of the bumper bar and which carries an upstanding prong or stud 12 which terminates in a reduced portion or point at the top. The plate 13 is shown with depending lugs or tongues 14 and 15 which overlie the two faces of the bumper bar and maintain the plate 13 from moving transversely of the bar. As shown, lug 15 is provided with a laterally extending flange 16, it being immaterial as to whether the flange 16 is formed integrally with 15 or attached thereto. As most clearly shown in Figs. 2 and 3, the same is formed as a part of the brace member 17 which may be secured to part 15 by a rivet 18 or equivalent means.

The cooperating member 19 consists of a portion 20 which underlies the lower edge of the bumper bar and the adjacent portions 21 and 22 which overlie the front and back faces of the bar, the same constituting substantially a hook for engaging the lower edge of the bar of the bumper. A flange 23 is provided which extends adjacent or substantially in alignment with the flange 16. The two flanges are connected by means of a bolt 24 and nut 25 or equivalent means. When the parts are seated on the edges of the bar as shown in the figures and the nut 25 tightened down on the bolt, the device is securely and firmly locked on the bumper bar.

To stiffen and make the device more attractive the prong 12 may be provided with flanges 26 and 27 at the sides which may be folded over and brought together at their meeting edges as indicated at 28 and the two edges brazed, spot welded or otherwise secured together. The stud or prong in the design of a pyramid is pleasing in appearance as well as rigid. To support and brace the two sides 26 and 27 the part 17 may be extended up as indicated at 29 and secured to the two sides, thereby reenforcing the head and preventing bending over of the prong 12. It will be noted, however, that the bottom edges of the flanges 26 and 27 rest directly on the bumper bar so that regardless of the brace 29 the side flanges brace and reenforce the prong 12. While the side flanges are not strictly essential, they do add to the appearance and perform the bracing function mentioned, as well as permit the use of lighter material without danger of the bending down of the stud.

The devices are ordinarily stamped out of metal of suitable gauge, as for example sheet steel, preferably a stainless steel, or of any other suitable material which may be plated. Devices made as described lend themselves to application on bumpers and bumperettes of various types or shapes and sizes, it being possible to purchase just the number required to properly equip the bar to the bumper and to apply them with only a screw driver as a tool. Obviously, a child or adult standing or sitting on the bumper bar equipped with these devices would find the same extremely uncomfortable. Many accidents result from this practice and these devices are intended to prevent the unauthorized riding on the bumper.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. An attachment for automobile bumpers comprising a spur adapted to be mounted on a crossbar of a bumper, including a plate having transversely spaced integral lugs extending downwardly intermediate its ends for engaging said crossbar, the upper end of said plate being provided with a pointed surface and the opposite end with a projecting member, and means engaging said projecting member for securely fastening the plate to the cross-bar.

2. An attachment for automobile bumpers comprising a spur adapted to be mounted on a crossbar of a bumper, including a plate having transversely spaced integral lugs extending downwardly intermediate its ends for engaging said crossbar, the upper end of said plate being provided with an upwardly convergent pyramidal surface and the opposite end with a brace member extending downwardly into operative engagement with a contiguous lug, means rigidly fastening said brace member to the cooperating lug and means engaging said base member for securely fastening the plate to said cross-bar.

3. An attachment for automobile bumpers comprising a spur adapted to be mounted on a cross-bar of a bumper, including a plate having transversely spaced integral lugs extending downwardly intermediate its ends for engaging the top of said cross-bar, the upper end of said plate being provided with a pointed surface and the opposite end with a projecting member, and means engaging said projecting member for securely fastening the plate to the cross-bar.

4. An attachment for automobile bumpers comprising a spur adapted to be mounted on a crossbar of a bumper, including a plate having an off-set therein, transversely spaced means intermediate the ends of the plate for engaging the top of said cross-bar, the upper end of said plate being provided with a pointed surface and the opposite end having a portion bent to form a flange, and means engaging said flange for securely fastening the plate to the bar.

5. An attachment for automobile bumpers comprising a spur adapted to be mounted on a cross-bar of a bumper, including a plate having an off-set portion intermediate its ends, means integral with said off-set portion for engaging the top of said cross-bar, the upper end of said plate being provided with a relatively sharp point and the opposite end having a portion bent to form a flange, and means engaging said flange for securely fastening the plate to the bar.

6. An attachment for automobile bumpers comprising a spur adapted to be mounted on a crossbar of a bumper, including a plate having an off-set portion intermediate its ends, means adjacent the front of said off-set portion for engaging the top of said cross-bar, the upper end of said plate being provided with a pointed projection, and the opposite end having a portion bent to form a flange, and means engaging said flange for securely fastening the plate to the bar.

7. An attachment for automobile bumpers comprising a spur adapted to be mounted on a cross-bar of a bumper, including a plate having an off-set portion intermediate its ends, transversely spaced integral lugs extending from the front of said off-set portion for engaging the top of said cross-bar, the upper end of said plate being provided with a pointed projection and the opposite end having a portion bent to provide a flange, and means engaging said flange for fastening the plate to the bar.

8. An attachment for automobile bumpers comprising a spur adapted to be mounted on a cross-bar of a bumper, including a plate having an off-set portion intermediate its ends, integrally spaced lugs adjacent the off-set portion for engaging the top of said bar, the end of the plate extending upwardly from said off-set portion and between said lugs being pointed and the end of the plate adapted to engage the back of said bar having a portion upturned to provide a flange, and means mounted on said flange for fastening the plate to the bar, said means including a lug adapted to engage the underside of the bar.

9. An attachment for automobile bumpers comprising a spur adapted to be mounted on a cross-bar of a bumper, including a plate having an off-set intermediate its ends, integrally spaced lugs extending from the front of said off-set portion for engaging the top of said cross-bar, the end of the plate extending upwardly from said off-set portion being provided with a pointed member and the end extending down the back of the bar having a portion bent backwardly to provide a flange, and means engaging said flange for fastening the plate to the bar, said means including a lug having a flange and a U-shaped depressed portion adapted to engage the underside of said bar.

10. An attachment for automobile bumpers comprising a spur adapted to be mounted on a crossbar of a bumper, including a plate having an off-set intermediate its ends, means adjacent the off-set for engaging the top of said cross-bar, the end of said plate extending above the off-set being provided with a pointed spur and the end of the plate extending below the off-set having a portion bent backwardly to provide a flange, a clamping lug having a depressed portion adapted to engage the bottom of said cross-bar, and means connecting said plate and lug for bringing them into clamping arrangement with the cross-bar.

ADOLPH HUNZIKER, JR.